Sept. 2, 1941. M. E. JONES 2,254,292
SCOOP ATTACHMENT FOR TRACTORS
Filed March 24, 1941 2 Sheets-Sheet 1

Inventor:
MARTIN E. JONES

Eaton & Brown
Attorneys

Sept. 2, 1941. M. E. JONES 2,254,292
SCOOP ATTACHMENT FOR TRACTORS
Filed March 24, 1941 2 Sheets-Sheet 2
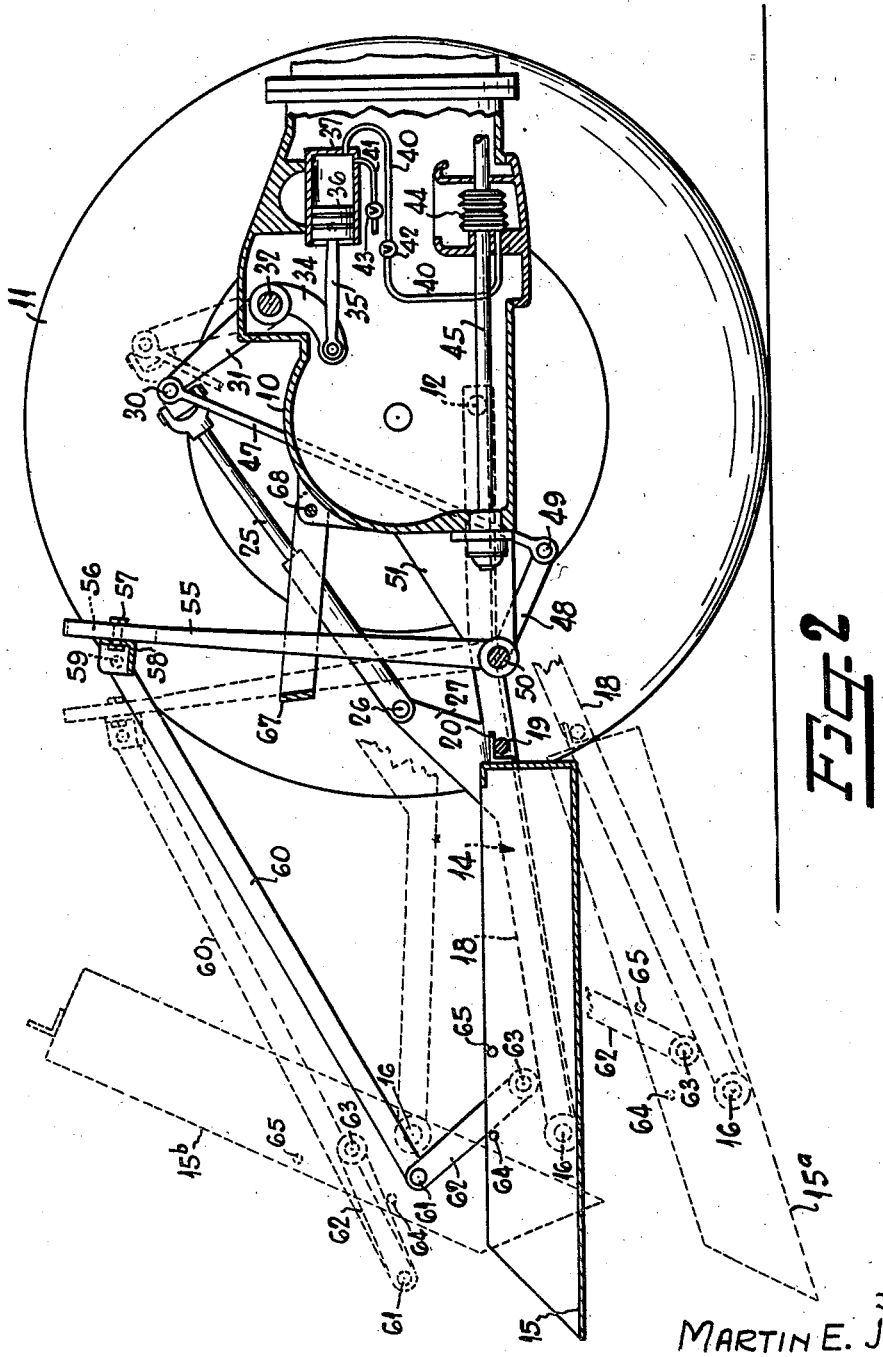
Inventor:
MARTIN E. JONES
Eaton & Brown
Attorneys Patented Sept. 2, 1941

2,254,292

UNITED STATES PATENT OFFICE 2,254,292

SCOOP ATTACHMENT FOR TRACTORS

Martin E. Jones, Granite Falls, N. C.

Application March 24, 1941, Serial No. 384,901

7 Claims. (Cl. 37—124)

This invention relates to loading and unloading apparatus and more especially to a scoop attachment to be used in combination with a traction engine.

It is an object of this invention to provide a scoop which is manipulated by a tractor operated lifting and lowering mechanism, in combination with a lever arrangement which automatically positions the scoop in an angular position relative to the surface of the earth when in lowered position, and which automatically tilts the scoop for unloading when raised to its uppermost position. This same means permits the scoop to remain substantially horizontal when it is positioned midway between the lowermost and uppermost positions. Usually the scoop is loaded by the movement of the traction engine when in lowermost position, after which it is elevated to the midway horizontal position so that the contents can be transported without spilling. Upon reaching the unloading point, the scoop is elevated to uppermost position to cause the same to tilt and empty the contents therefrom.

It is another object of this invention to provide a mechanism of the class described employing a scoop pivotally supported near the loading end so that the center of gravity of the scoop will normally prevent the same from tilting to unloading position. A positive means is employed for tilting the scoop for emptying as it nears uppermost position.

Some of the objects of the invention having been stated, other objects will appear as the description proceeds when taken in connection with the accompanying drawings, in which—

Figure 2 is a longitudinal sectional view taken along the line 2—2 in Figure 1.

Figure 1:
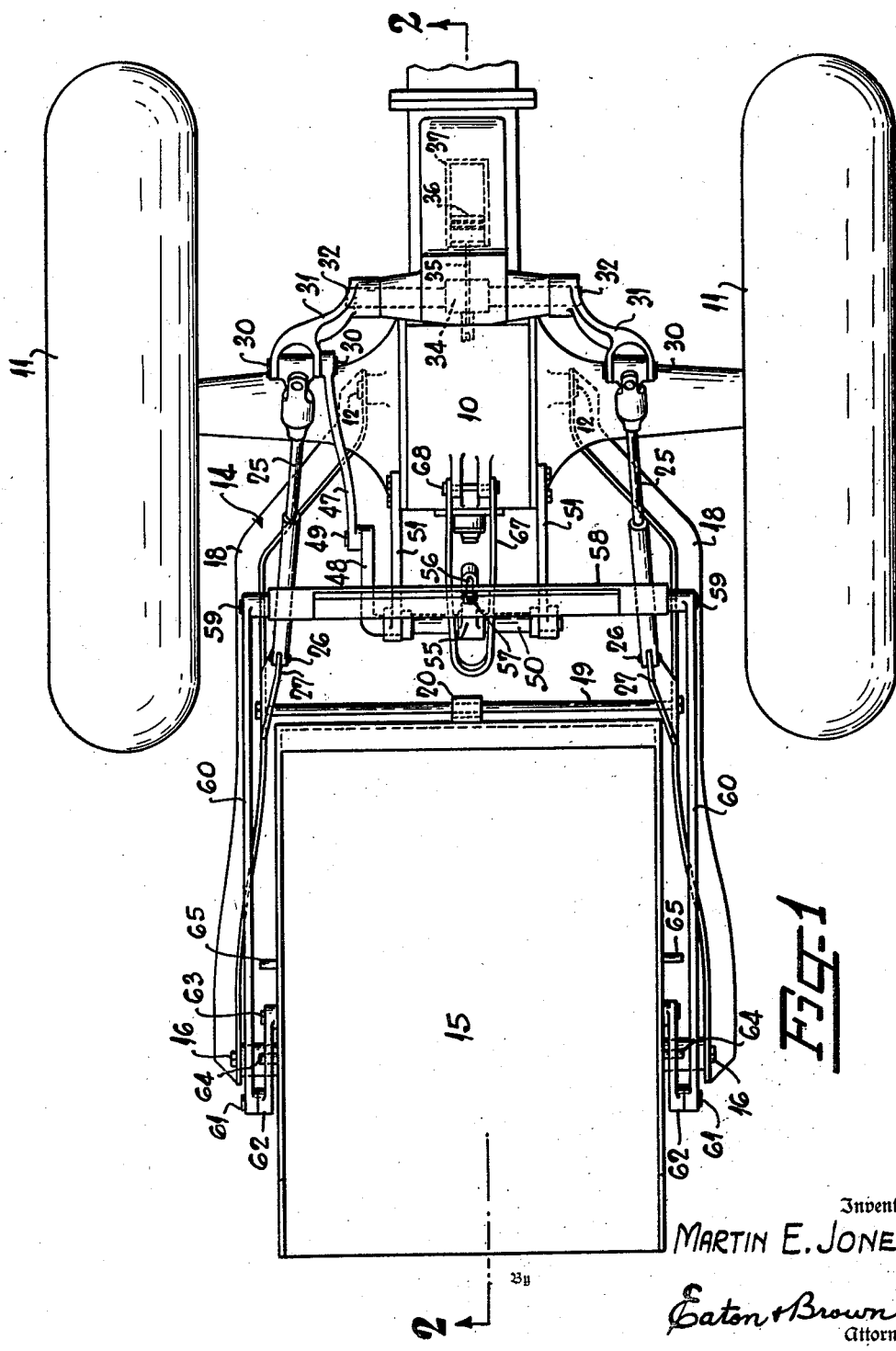
Figure 1 is a plan view of the rear portion of a traction engine showing my improved scoop attachment mounted thereon.

Referring more particularly to the drawings, the numeral 10 denotes a conventional differential housing on the rear portion of a tractor, said housing having wheels 11 rotatably mounted at each end thereof. The central lower portion of the differential housing 10 has pivoted thereto as at 12, a boom broadly designated by the reference character 14, said boom extending rearwardly of the tractor and having a scoop 15 pivotally secured on the free end thereof, as at 16. It will be noted that the scoop is disposed with its open receiving end in a remote position from the rear portion of the tractor; whereas the closed end of the scoop is disposed adjacent the tractor. Also the pivot points 16 are located nearer the open end than the closed end so that gravity will normally tend to rotate the open end of the scoop upwardly and the closed end downwardly. The boom specifically comprises a pair of angle members 18 having their intermediate portions connected by a transverse rod 19. This rod 19 additionally serves as a support for the rear closed end of the scoop 15. Scoop 15 has an angle bracket 20 secured to the closed end, which bracket normally rests upon the rod 19, thereby limiting the amount of downward rotation of the closed end of the scoop.

The scoop is raised and lowered by a suitable hydraulically operated means. This means comprises a pair of upwardly disposed links 25, the lower ends of which are pivoted as at 26 to upstanding plates 27, said plates 27 forming an integral part of the intermediate portions of angle members 18.

The upper ends of the links 25 are connected as at 30 to the upper free ends of levers 31. These levers are, in turn, fixedly secured upon a transverse shaft 32, rotatably mounted in the differential housing 10. By referring to Figure 2, it is seen that the intermediate portion of the shaft 32 has a downwardly extending lever 34 fixedly secured thereon. The lower free end of the lever 34 has pivotally connected thereto one end of a connecting rod 35, the other end of said connecting rod being pivotally connected to piston 36. This piston is mounted for reciprocation within a suitable ram cylinder 37. In order to actuate the piston 36 to cause the levers 31 and links 25 to raise and lower the boom 14 and scoop 15, it is necessary to introduce and exhaust respectively, a suitable fluid from the ram cylinder. This fluid manipulation is controlled by means of suitable inlet and exhaust pipes 40 and 41, having valves 42 and 43, respectively therein. The lower end of pipe 40 communicates with a suitable hydraulic pump 44 mounted on power take-off shaft 45. The valves 42 and 43 are actuated by a suitable mechanism, not shown, for the introduction or expelling of the fluid from the ram cylinder 37. Since this actuating mechanism is conventional, the valves are shown schematically and the operating means is omitted from the drawings.

Scoop tilting apparatus

As heretofore stated, the scoop is pivoted nearer the open end than the closed end; consequently after it is loaded there is a normal tendency for the closed end of the scoop to move downwardly. As a result of this construction, it is necessary to have positive means for tilting the scoop as it is raised, so that the contents may be released therefrom at the desired time. The upper free end of one of the arms 31 also has pivoted thereto as at 30, a downwardly extending link 47, which link 47 has its lower end pivoted to lever 48 as at 49. Lever 48 forms an integral part of horizontally disposed shaft 50, which shaft is rotatably mounted in bracket 51 secured to the differential housing 10. An upwardly extending lever 55 has its lower end fixedly secured to the intermediate portion of shaft 50, said lever having a slot 56 in the upper end thereof in which is adjustably mounted a bolt 57, which bolt also penetrates a transversely disposed beam or angle member 58. This angle member extends substantially equi-distantly in a lateral direction on each side of the bolt 57, and has pivoted on each end thereof as at 59, a downwardly extending link 60, the lower end of each of the links 60 being pivoted as at 61 to the upper free end of a link 62. The links 62 are pivoted as at 63 to opposed sides of scoop 15 and are adapted to rotate through an arc the length of which is limited by suitable laterally extending stops 64 and 65, said stops projecting from the outer sidewalls of the scoop. In other words, in Figure 2, the counter-clockwise rotation of lever 62 is limited by the stop 64, whereas the clockwise rotation of this same lever is limited by the stop 65.

Operation

When it is desired to lower the scoop to loading position 15a, (Figure 2) the fluid is released from the ram cylinder 37 through pipe 41 and valve 43 by means of a conventional mechanism not shown. When in a lowered position, the closed end of the scoop will be supported by transverse rod 19 to prevent further clockwise rotation about pivot points 16 and at the same time, the upwardly extending links 62 will engage the upper sides of projections 65 to prevent counter-clockwise rotation. With the scoop in lowered position, the tractor is placed in reverse. As the scoop and tractor travel backwardly dirt or other material is loaded therein. After loading the scoop is raised to horizotnal bold line position by the introduction of fluid into the ram cylinder 37. The material is usually transported from one location to another while the scoop is in horizontal position. When the location for dumping the material has been reached, additional fluid is forced into the ram cylinder 37 to raise the free end of the boom 14 and scoop 15 to still higher elevation 15b. During this additional rotation, from horizontal position in Figure 2, to uppermost dotted line position, the tilting mechanism, comprising members 47 to 62 inclusive, will come into action. In other words, as the lever 31 rotates in a clockwise manner in Figure 2 to dotted line position, the link 47 will be moved upwardly to thereby cause counter-clockwise rotation of lever 48, shaft 50 and the upwardly extending lever 55. When the lever 55 is rotated in a counter-clockwise direction, to dotted line position, the links 60 will be moved to the left to force the intermediate portion of links 62 against the stops 64 which project from the sidewalls of the scoop. Upon contacting these projections, any additional rotation of links 62 will cause the scoop to be tilted to dotted line position 15b.

It will be noted that a guide member 67 is provided for supporting the intermediate portion of upstanding lever 57. This guide member comprises a U-shaped bar having its ends pivoted as at 68 to the differential housing.

The slot 56 in the upper portion of the lever 55 is provided so that the elevation of transverse beam 58 may be adjusted. By varying the elevation of the transverse beam 58, the time of engagement of the studs 64 and 65 by the links 62 may be varied and therefore the time of tilting of the scoop may be varied.

In the drawings and specification, there has been set forth a preferred embodiment of the invention, and although specific terms are employed, they are used in a generic and descriptive sense only and not for purposes of limitation, the scope of the invention being set forth in the following claims.

I claim:

1. In combination, a tractor having one end of a boom pivoted thereto, a scoop pivotally connected to the free end of the boom, and having a closed end and an open end, said scoop pivot being disposed between the transverse center line of the scoop and said open end whereby the weight of the scoop will normally tend to rotate the open end upwardly and the closed end downwardly, means for limiting the downward rotation of said closed end, a power actuated lever rotatably mounted on said tractor, a link connecting the free end of said lever and said boom, and means controlled by the rotation of said lever for rotating the open end of the scoop downwardly about its pivot while the scoop is being elevated to thereby cause the contents to spill therefrom.

2. In combination, a tractor having one end of a boom pivoted thereto, a scoop pivotally connected to the free end of the boom, and having a closed end and an open end, a power actuated lever rotatably mounted on said tractor, a link connecting the free end of the said lever and said boom, and means controlled by the rotation of said lever for rotating the open end of the scoop downwardly about its pivot while it is being elevated to cause the contents to spill therefrom.

3. In combination, a tractor having one end of a boom pivoted thereto, a scoop pivotally connected to the free end of the boom, and having a closed end and an open end, a power actuated lever rotatably mounted on said tractor, a link connecting the free end of said lever and said boom, and means including a link and lever chain for positively rotating the open end of the scoop downwardly about its pivot while the scoop is being elevated by said boom to thereby cause the contents to be emptied from the scoop.

4. In combination, a tractor having one end of a boom pivoted thereto, a scoop pivotally connected to the free end of the boom and having a closed end and an open end, said scoop pivot being disposed between the transverse center line of the scoop and said open end whereby the weight of the scoop will normally tend to rotate the open end upwardly and the closed end downwardly, means for limiting the downward rotation of said closed end, means for limiting the upward movement of said closed end when the scoop is lowered to loading position, a power actuated lever rotatably mounted on said tractor, a link connecting the free end of said lever and said boom for raising and lowering the boom, and means controlled by the rotation of said lever for rotating the open end of the scoop downwardly about its pivot while it is being elevated to cause the contents to spill therefrom.

5. In combination, a tractor having one end of a boom pivoted thereto, a scoop pivotally connected to the free end of the boom, and having a closed end and an open end, said scoop pivot being disposed between the transverse center line of the scoop and said open end whereby the weight of the scoop will normally tend to rotate the open end upwardly and the closed end downwardly, means for limiting the downward rotation of said closed end, a power actuated lever rotatably mounted on said tractor, a link connecting the free end of said lever and said boom for raising and lowering the boom, a projection extending laterally from the scoop, a second link having one end thereof pivoted to said scoop and being adapted to engage said projection to tilt the scoop, connecting means between the other end of said second link and said lever whereby the rotation of said lever will rotate said second link and scoop about the scoop pivot, means for rotating said lever to simultaneously raise said boom and attached scoop.

6. In combination, a tractor having one end of a boom pivoted thereto, a scoop pivotally connected to the free end of the boom, and having a closed end and an open end, said scoop pivot being disposed between the transverse center line of the scoop and said open end whereby the weight of the scoop will normally tend to rotate the open end upwardly and the closed end downwardly, means for limiting the downward rotation of said closed end, a power actuated lever rotatably mounted on said tractor, a link connecting the free end of said lever and said boom for raising and lowering the boom, a projection extending laterally from the scoop, a second link having one end thereof pivoted to said scoop and being adapted to engage said projection to tilt the scoop, connecting means between the other end of said second link and said lever whereby the rotation of said lever will rotate said second link and scoop about the scoop pivot, means for rotating said lever to simultaneously raise said boom and attached scoop, and a second projection extending laterally from the scoop and engageable by said second link when the scoop is in a lowered position to thereby prevent upward rotation of the scoop about its pivot when loading the same.

7. In combination, a tractor having one end of a boom pivoted thereto, a scoop pivotally connected to the free end of the boom and having a closed end and an open end, said scoop pivot being disposed between the transverse center line of the scoop and said open end whereby the weight of the scoop will normally tend to rotate the open end upwardly and the closed end downwardly, means for limiting the downward rotation of said closed end, a power actuated lever rotatably mounted on said tractor, a link connecting the free end of said lever and said boom for raising and lowering the boom, a projection extending laterally from the scoop, a second link having one end thereof pivoted to said scoop and being adapted to engage said projection to tilt the scoop, connecting means between the other end of said second link and said lever whereby the rotation of said lever will rotate said second link and scoop about the scoop pivot, means for rotating said lever to simultaneously raise said boom and attached scoop, a second projection extending laterally from the scoop and engageable by said second link when the scoop is in a lowered position to thereby prevent upward rotation of the scoop about its pivot when loading the same, and means for varying the time when said second link will contact the first-named projection while the scoop is being raised.

MARTIN E. JONES.